(12) United States Patent (10) Patent No.: US 10,339,923 B2
Kochura et al. (45) Date of Patent: Jul. 2, 2019

(54) RANKING BASED ON SPEECH PATTERN DETECTION

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 6 days.

(21) Appl. No.: 15/261,739

(22) Filed: Sep. 9, 2016

(65) Prior Publication Data

US 2018/0075845 A1 Mar. 15, 2018

(51) Int. Cl.
*G10L 15/18* (2013.01)
*G10L 25/90* (2013.01)
*G06F 16/635* (2019.01)
*G06F 16/2457* (2019.01)
*G10L 25/48* (2013.01)
(Continued)

(52) U.S. Cl.
CPC .... *G10L 15/1807* (2013.01); *G06F 16/24578* (2019.01); *G06F 16/3329* (2019.01); *G06F 16/636* (2019.01); *G10L 15/1822* (2013.01); *G10L 25/48* (2013.01); *G10L 25/90* (2013.01); *G06F 17/2785* (2013.01)

(58) Field of Classification Search
CPC ......... G10L 15/26; G10L 15/04; G10L 15/08; G10L 15/01; G10L 25/78; G10L 25/87; G10L 15/02; G10L 15/1807; G10L 15/1822; G10L 25/90; G10L 25/48; G10L 15/18; G10L 17/30; G06F 17/2765; G06F 17/2775; G06F 17/30787; G06F 17/3086; G06F 16/24578; G06F 16/3329; G06F 16/636; G06F 17/2785; G06F 17/3053; G06F 17/30764

See application file for complete search history.

(56) References Cited

U.S. PATENT DOCUMENTS 6,269,189 B1 7/2001 Chanod
7,203,646 B2 4/2007 Bennett
(Continued)

FOREIGN PATENT DOCUMENTS

EP 2 703 956 3/2014

OTHER PUBLICATIONS

Brennen et al., The Feeling of ANother's Knowing: Prosody and Filled Pauses as to Cues to Listeners about Metacognitive State of Speakers, (1995), J. Mem and Lang 34.*
Benus et al., "Pauses in Deceptive Speech," dated 2006, Third Speech Prosody Conference, Dresden, Germany, Total 4 pages.
Brennan et al., "The Feeling of Another's Knowing: Prosody and Filled Pauses as Cues to Listeners about the Metacognitive States of Speakers," J Mem & Lang 34, dated 1995, Total 16 pages.
(Continued)

*Primary Examiner* — Angela A Armstrong
(74) *Attorney, Agent, or Firm* — Janaki K. Davda; Konrad, Raynes, Davda and Victor LLP

(57) ABSTRACT

Provided are techniques for processing a query in a Q&A system and ranking search results based on speech pattern detection. In response to the query, search results comprising items from multiple items are identified. The search results are ranked based on a confidence score associated with each of the items from the multiple items. The confidence score is generated for each of the items by, detecting speech characteristics of the item, determining a hesitation level of the item based on the speech characteristics, and generating a confidence score based on the hesitation level.

20 Claims, 8 Drawing Sheets

(51) Int. Cl.
*G06F 16/332* (2019.01)
*G06F 17/27* (2006.01)

(56) References Cited

U.S. PATENT DOCUMENTS

| | | |
|---|---|---|
| 7,640,272 B2 | 12/2009 | Mahajan et al. |
| 8,209,171 B2 | 6/2012 | Abbott et al. |
| 8,457,967 B2 | 6/2013 | Audhkhasi et al. |
| 8,719,004 B2 | 5/2014 | Siminoff |
| 9,064,492 B2 | 6/2015 | Ganong, III et al. |
| 2011/0040554 A1* | 2/2011 | Audhkhasi ............. G09B 19/04 704/9 |
| 2015/0195406 A1 | 7/2015 | Dwyer et al. |
| 2015/0206443 A1 | 7/2015 | Aylesworth et al. |
| 2015/0206544 A1 | 7/2015 | Carter |

OTHER PUBLICATIONS

"Ellipses" (online) retrieved from the Internet at URL: http://www.thepunctuationguide.com/ellipses.html, PDF being submitted created Feb. 25, 2016, Total 4 pages.

"Filler (linguistics)" (online) retrieved from the Internet at URL: https://en.wikipedia.org/wiki/Filler_(linguistics), PDF being submitted created Feb. 25, 2016, Total 4 pages.

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Computer Society, Recommendations of the National Institute of Standards and Technology, Total 7 pages.

\* cited by examiner

RANKING BASED ON SPEECH PATTERN DETECTION

FIELD

Embodiments of the invention relate to ranking (of speeches) based on speech pattern detection. In particular, embodiments of the invention are related to a question and answer system enhancement through speech pattern detection, which includes pause and speech characteristics detection.

BACKGROUND

There are may be moments when users (writers and speakers) hesitate as they write and speak. For example, if a writer is not sure about something, then the writer may add an ellipses string (" . . . ") into written text.

Many speakers fill gaps in their speeches with filler words (which may include filler phrases), instead of using a simple pause. This may be because speakers are uncomfortable with silence or because speakers are worried that someone else may jump in and interrupt. Filler words include, for example, "uh", "like", and "you know". An example sentence using filler words is: "I'm, like, uh, you know, convinced we're on the right track." Such filler words dilute what the speaker is saying, especially if the speaker is trying to persuade an audience. The filler words rob a speech of strength, often making the speaker appear unsure or tentative. If the speaker is not very confident about the question that the speaker is trying to answer, then, the speaker may drag out the length of the word being spoken.

SUMMARY

Provided is a method for processing a query in a Q&A system and ranking search results based on speech pattern detection. The method comprises, in response to the query, identifying, using a processor of a computer, search results comprising items from multiple items and ranking the search results based on a confidence score associated with each of the items from the multiple items. The confidence score is generated for each of the items by detecting speech characteristics of the item, determining a hesitation level of the item based on the speech characteristics, and generating a confidence score based on the hesitation level.

Provided is a computer program product for processing a query in a Q&A system and ranking search results based on speech pattern detection. The computer program product comprises a computer readable storage medium having program code embodied therewith, the program code executable by at least one processor to perform operations comprising: in response to the query, identifying search results comprising items from multiple items and ranking the search results based on a confidence score associated with each of the items from the multiple items. The confidence score is generated for each of the items by detecting speech characteristics of the item, determining a hesitation level of the item based on the speech characteristics, and generating a confidence score based on the hesitation level.

Provided is a computer system for processing a query in a Q&A system and ranking search results based on speech pattern detection. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: in response to the query, identifying search results comprising items from multiple items and ranking the search results based on a confidence score associated with each of the items from the multiple items. The confidence score is generated for each of the items by detecting speech characteristics of the item, determining a hesitation level of the item based on the speech characteristics, and generating a confidence score based on the hesitation level.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A Question and Answer (Q&A) system receives questions, searches a data store for one or more answers, and provides the answers. Embodiments take into consideration the user of filler words as a factor in evaluating a user's hesitation level in order to derive the confidence level of the data that the user provides. With embodiments, filler words include filler phrases that are each made up of several words. Also, with embodiments, filler words include characters or symbols representing "filler" content, such as ellipses.

Figure 1:
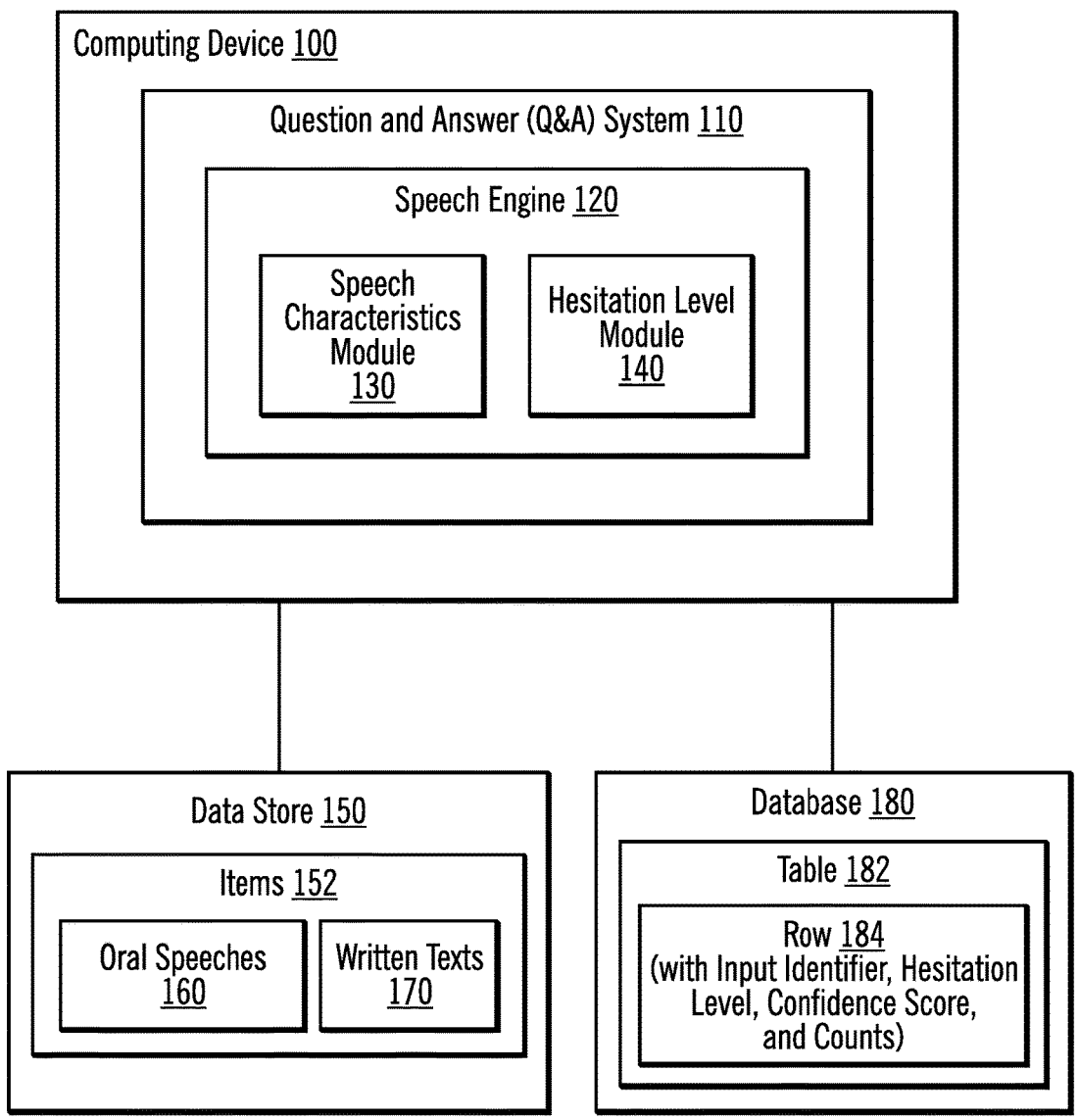
FIG. 1 illustrates, in a block diagram, a computing environment in accordance with certain embodiments.

FIG. 1 illustrates, in a block diagram, a computing environment in accordance with certain embodiments. A computing device 100 includes a Q&A system 110, which includes a speech engine 120. The speech engine 120 includes a speech characteristics module 130 and a hesitation level module 140. In other embodiments, the speech engine 120 incorporates the logic of the speech characteristics module 130 and the hesitation level module 140. The computing device 100 is coupled to a data store 150 and to a database 180. The data store 150 stores items 152, which include oral speeches 160 and written texts 170. Each of the oral speeches 160 and written texts 170 may be described as an item with an item identifier. For each item, the database 180 stores tables, such as table 182. Table 182 stores data for the speech engine 120. With embodiments, there is a row 184, for each item (i.e., an oral speech 160 or a written text 170), with the item identifier (of an oral speech 160 or a written text 170), a hesitation level, a confidence score, and counts. With embodiments, this information may be stored in a row of a table in the database 180. The speeches 160 may be recordings (e.g., video or sound recordings) in which a user is speaking, etc. For analysis, the speech engine 120 may convert a recording to text form.

The speech engine 120 uses speech pattern detection to rank a confidence level of that user. With embodiments, the speech pattern detection is detection of pauses and filler words that are expressed through a user's oral speech or written text.

In particular, the speech engine 120 detects pauses, as well as, filler words in different languages (used in different countries) from the user's oral speech or written text. Different languages (e.g., French, Chinese, etc.) may have different filler words. The speech engine 120 ranks the confidence level of the user based on the occurrences of the pauses and the filler words in the oral speech or written text.

With embodiments, the speech engine 120 assumes that the user is using a native language or using a language that the user is proficient enough in that it may be considered to be the user's native language during text and voice item. In certain embodiments, the oral speech or written text includes portions in different languages, and the speech engine 120 translates (using machine translation) to a core language used by the Q&A system 110 or the core language used in the oral speech or written text.

The speech engine 120 collects previously recorded sample speeches and previously written text from the same user in order to establish a baseline for the user.

The speech engine 120 categorizes the user into either an entry level speaker or a more advanced speaker. With embodiments, each user is evaluated with reference to other users of the same level to make sure the search results are accurate (e.g., an expert speaker is not compared with a novice speaker).

The speech engine 120 also collects the user's profile data, such as job category, how the user was tagged in a social networking website, etc. in order to predetermine the user's expertise level in a certain topic. The speech engine 120 takes into consideration whether the user has stuttering or other speech issues.

Figure 2:
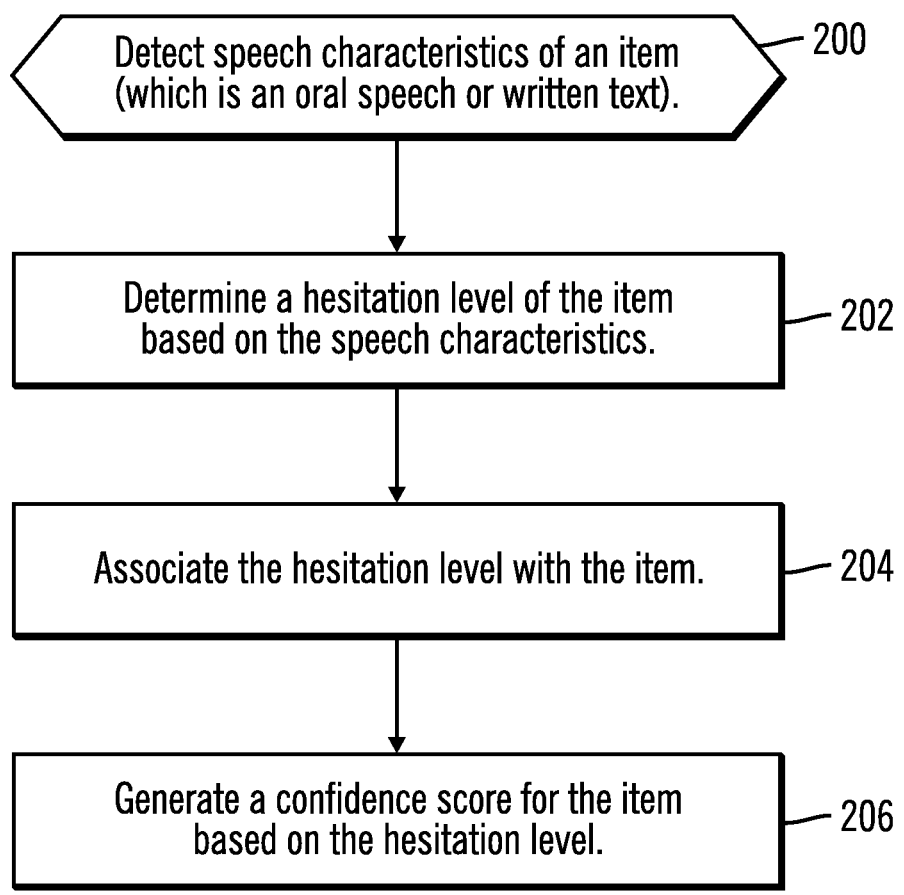
FIG. 2 illustrates, in a flow chart, operations for associating a hesitation level with an item in accordance with certain embodiments.

FIG. 2 illustrates, in a flow chart, operations for associating a hesitation level with an item in accordance with certain embodiments. The item may be an oral speech or written text. With embodiments, the operations of FIG. 2 is performed for each item in a set of items. Also, with embodiments, the operations of FIG. 2 may be done periodically.

Control begins at block 200 with the speech engine 120 detecting speech characteristics of an item. In block 202, the speech engine 120 determines a hesitation level of the item based on the speech characteristics. In block 204, the speech engine 120 associates the hesitation level with the item. The hesitation level may be described as a confidence score, which indicates a confidence level of the user associated with the item. In block 206, the speech engine 120 generates a confidence score for the item based on the hesitation level. With embodiments, the item identifier, hesitation level, and confidence score are stored in the database. The item identifier maps to the corresponding item (i.e., an oral speech 160 or a written text 170). With embodiments, the higher the hesitation level, the lower the confidence score of the item. Thus, the speech engine 120 assigns a lower confidence score to the item as the hesitation level gets higher.

Figure 3:
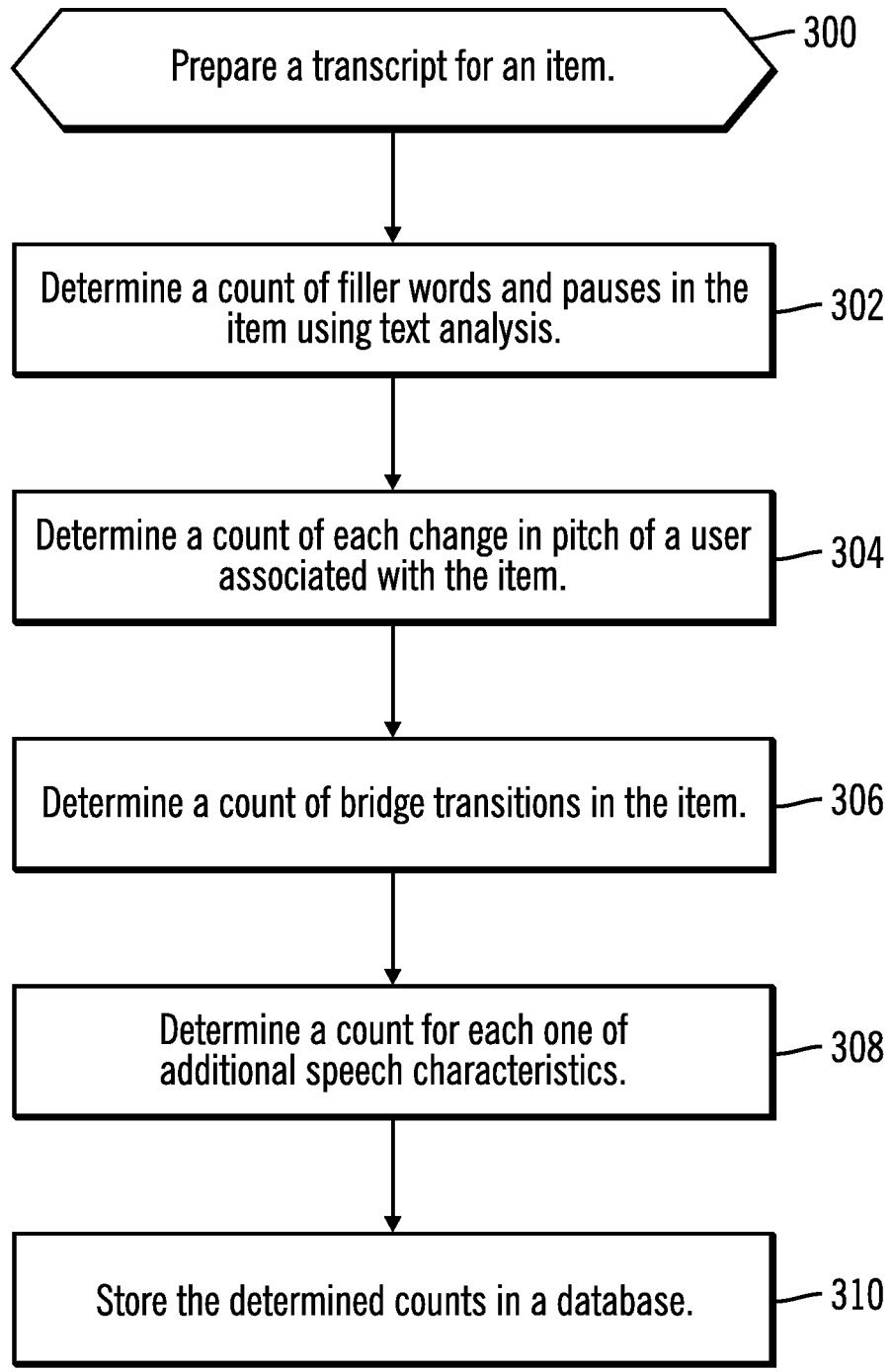
FIG. 3 illustrates, in a flow chart, operations for detecting speech characteristics of an item in accordance with certain embodiments.

FIG. 3 illustrates, in a flow chart, operations for detecting speech characteristics of an item in accordance with certain embodiments. The item may be an oral speech or written text. With embodiments, the operations of FIG. 3 are performed by the speech characteristics module 130 of the speech engine 120. Control begins at block 300 with by the speech characteristics module 130 of the speech engine 120 preparing a transcript for an item. For an oral speech, the speech engine 120 converts the oral speech to written text. With embodiments, the speech characteristics module 130 of the speech engine 120 utilizes existing Application Programming Interfaces (APIs) to convert the oral speech into written text. In addition, the speech characteristics module 130 of the speech engine 120 identifies a language that is used in the converted written text or original written text (if the item was originally written text). The speech characteristics module 130 of the speech engine 120 searches for the known filler words in that particular language. The speech characteristics module 130 of the speech engine 120 scans through the converted written text or original written text to search for those known filler words in that language. The speech characteristics module 130 of the speech engine 120 further searches for strings such as ellipses. Thus, here, the speech engine 120 detects the filler words for the transcript so that filler words and pauses are added to the complete transcript.

In block 302, the speech engine 120 determines a count of filler words and pauses in the item using text analysis. The item may be the transcribed item or may be an item that was received as written text. The speech engine counts and stores the total count of each of the instances of each of the filler words (e.g., ellipses found 3 times; "uh" found 6 times, etc.). With embodiments, the speech engine 120 considers some known factors (e.g., that the user stutters) and will exclude the instances in which the user has stuttered as filler words.

In block 304, the speech characteristics module 130 of the speech engine 120 determines a count of each change in pitch of a user associated with the item (e.g., the user is the speaker of an oral speech or the writer of written text). That is, the speech engine 120 detects a vocal level change. In particular, the speech engine 120 further captures a general tone of a user through a period of time. The speech engine 120 captures the tone and vocal level the user uses during the associated speech. The speech engine 120 analyzes whether there are any vocal level changes between the user's day-to-day vocal level versus the vocal level used in the speech. If so, the speech engine 120 tags the text that is associated with the instances in which the user's vocal level changes from a high pitch to a low pitch or vice versa). The speech engine 120 stores that information.

In block 306, the speech characteristics module 130 of the speech engine 120 determines a count of bridge transitions ("bridge phrases") in the item. When a speaker answers questions during public speaking, it is common for the speaker to say "that is a great question!" when the user is not sure about the answer and has to bridge or deviate the conversation to a different topic. The speaker may use a bridge transition to avoid answering questions from the audience directly. The speech engine 120 identifies such bridge transitions.

In block 308, the speech characteristics module 130 of the speech engine 120 determines a count for each one of additional speech characteristics. With embodiments, the speech engine 120 identifies the following speech characteristics as part of the criteria to determine a user's confidence level: articulation, pronunciation, speech disfluency, speech pitch, speech rate, and speech rhythm.

In block 310, the speech characteristics module 130 of the speech engine 120 stores the determined counts in the database (from blocks 302-308).

Figure 4:
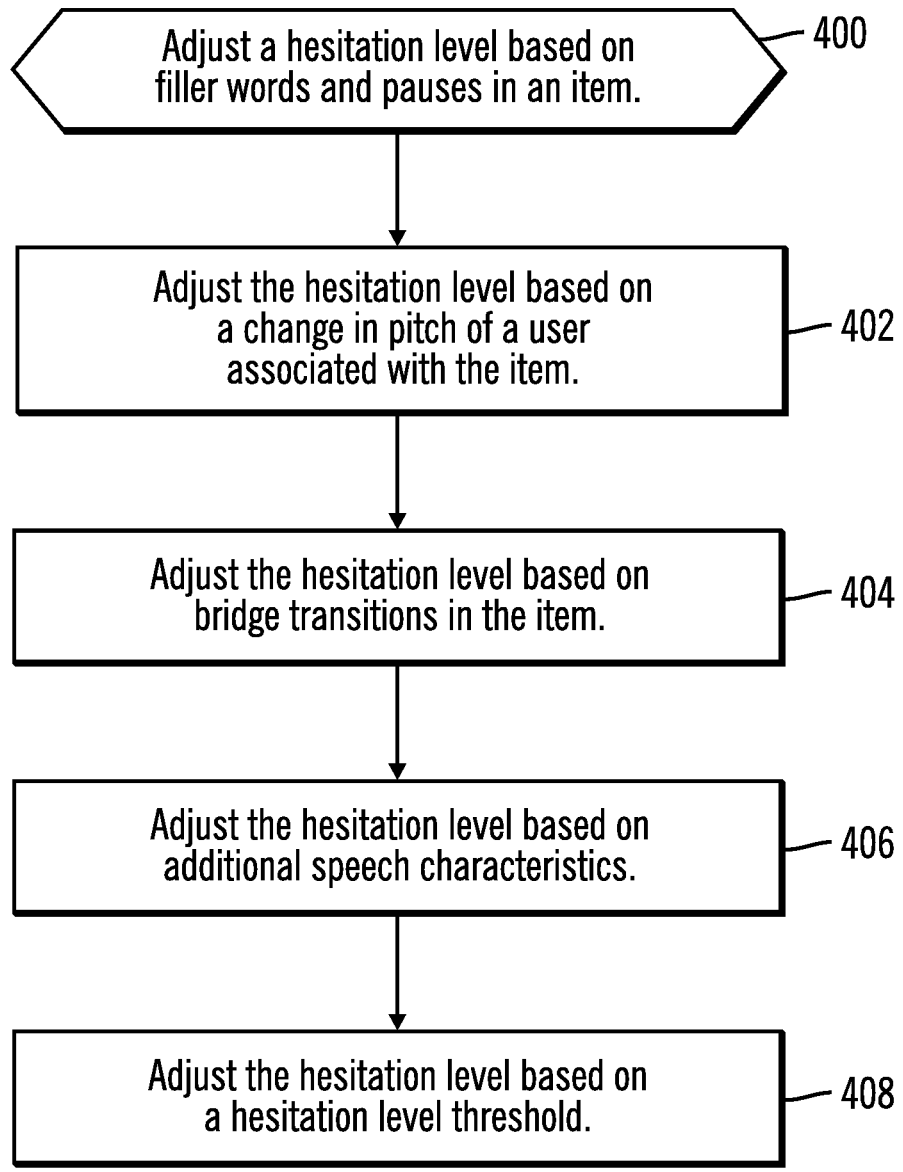
FIG. 4 illustrates, in a flow chart, operations for determining a hesitation level of an item in accordance with certain embodiments.

FIG. 4 illustrates, in a flow chart, operations for determining a hesitation level of an item in accordance with certain embodiments. The item may be an oral speech or written text. With embodiments, the operations of FIG. 4 are performed by the hesitation level module 140 of the speech engine 120.

With embodiments, based on the counts calculated for the various speech characteristics, the speech engine 120 maps the counts to the user's hesitations level. Control begins at block 400 with the speech engine 120 adjusting a hesitation level based on filler words and pauses in an item. With embodiments, the greater the count of filler words and pauses that are detected, the more the hesitation level is increased by the speech engine 120.

In block 402, the hesitation level module 140 of the speech engine 120 adjusts the hesitation level based on a change in pitch of a user associated with the item (e.g., the speaker of the oral speech or the writer of the written text). With embodiments, if the user does not use a low pitch voice on a daily basis and speaks often using a low pitch in the item, the more the hesitation level is increased by the speech engine 120.

In block 404, the hesitation level module 140 of the speech engine 120 adjusts the hesitation level based on bridge transitions in the item. With embodiments, the greater the count of bridge transitions ("bridge phrases") that are detected, the more the hesitation level is increased by the speech engine 120.

In block 406, the hesitation level module 140 of the speech engine 120 adjusts the hesitation level based on additional speech characteristics. For example, the worse the user's articulation, pronunciation, and fluency, the more the hesitation level is increased by the speech engine 120. As another example, the least variation the user used in terms of speech pitch, rate and rhythm, the more the hesitation level is increased by the speech engine 120.

In block 408, the hesitation level module 140 of the speech engine 120 adjusts the hesitation level based on a hesitation level threshold. In certain embodiments, the adjustment to the hesitation level threshold is based on a user's public speaking experience level and the user's expertise level for the presented topic. With embodiments, if the user tends to have a high hesitation level in daily activities, then the speech engine 120 sets the hesitation level threshold high for that user; if the user tends to have a low hesitation level in daily activities, then the speech engine 120 sets the hesitation level low for that user. The hesitation level threshold is a baseline to measure a user's hesitation level. For example, if a user does not use a lot of filler words in daily speech/text, but the user does so in a particular speech, then this speech will be rated with a higher hesitation level. Thus, the hesitation level may be adjusted by the hesitation level threshold baseline per user.

Figure 5:
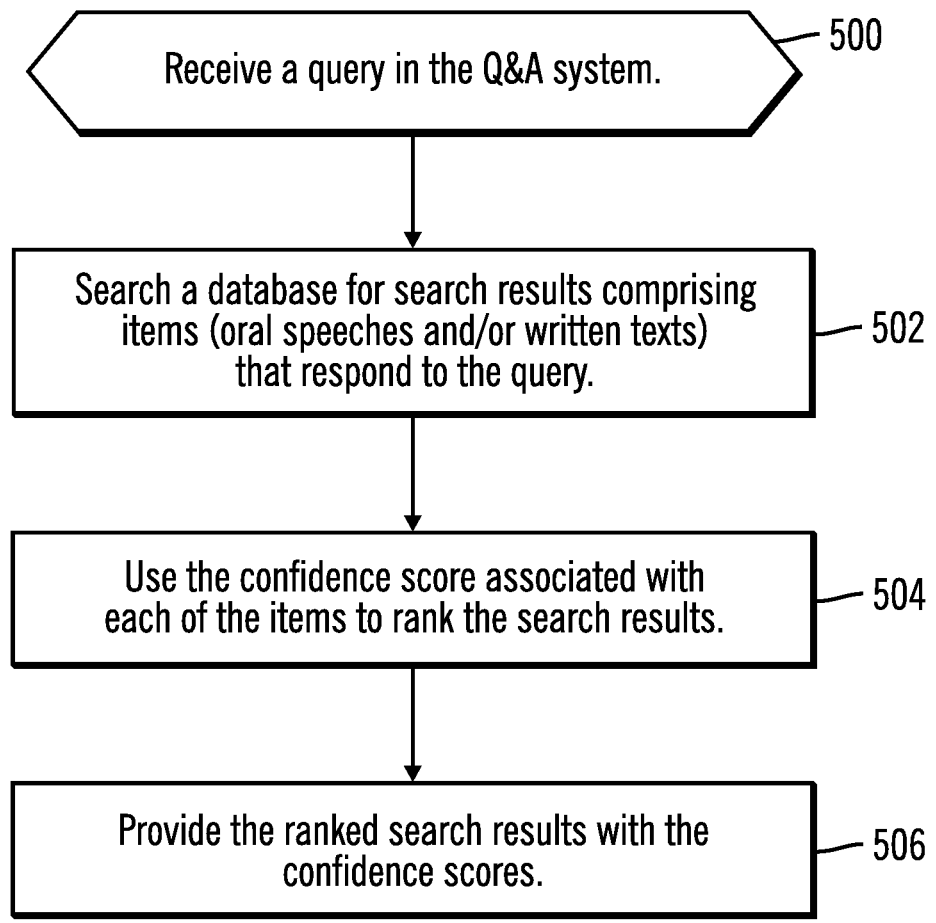
FIG. 5 illustrates, in a flow chart, operations for ranking search results using hesitation levels in accordance with certain embodiments.

FIG. 5 illustrates, in a flow chart, operations for ranking search results using hesitation levels in accordance with certain embodiments. Control begins at block 500 with the Q&A system 110 receiving a query (which is a type of search request or question). An example query is: "what is the difference between classification and prediction in data mining". In block 502, the Q&A system searches the database 180 for search results comprising items (oral speeches and/or written texts) that respond to the query. In block 504, the Q&A system 110 uses the confidence score associated with each of the items to rank the search results. In block 506, the Q&A system 110 provides the ranked search results with the confidence scores. With embodiments, the Q&A system 110 provides the ranked search results by displaying the ranked search results along with the confidence scores on a computer display screen. Thus, the Q&A system 110 provides the ranked search results based on the confidence levels after the data retrieval.

Embodiments build a speech confidence model that evaluates a speech confidence score for information retrieval ranking. That is, embodiments build a speech confidence model that applies various speech characteristics in the context of the speaker's public speaking experience level and expertise level for the presented content. Embodiments evaluate the speaker confidence in the speech content as a confidence score and apply this confidence score to the information retrieval results ranking. Embodiments detect a shift of the speaker's speech characteristics, which are associated with different confidence scores to various segments of the speech.

Figure 6:
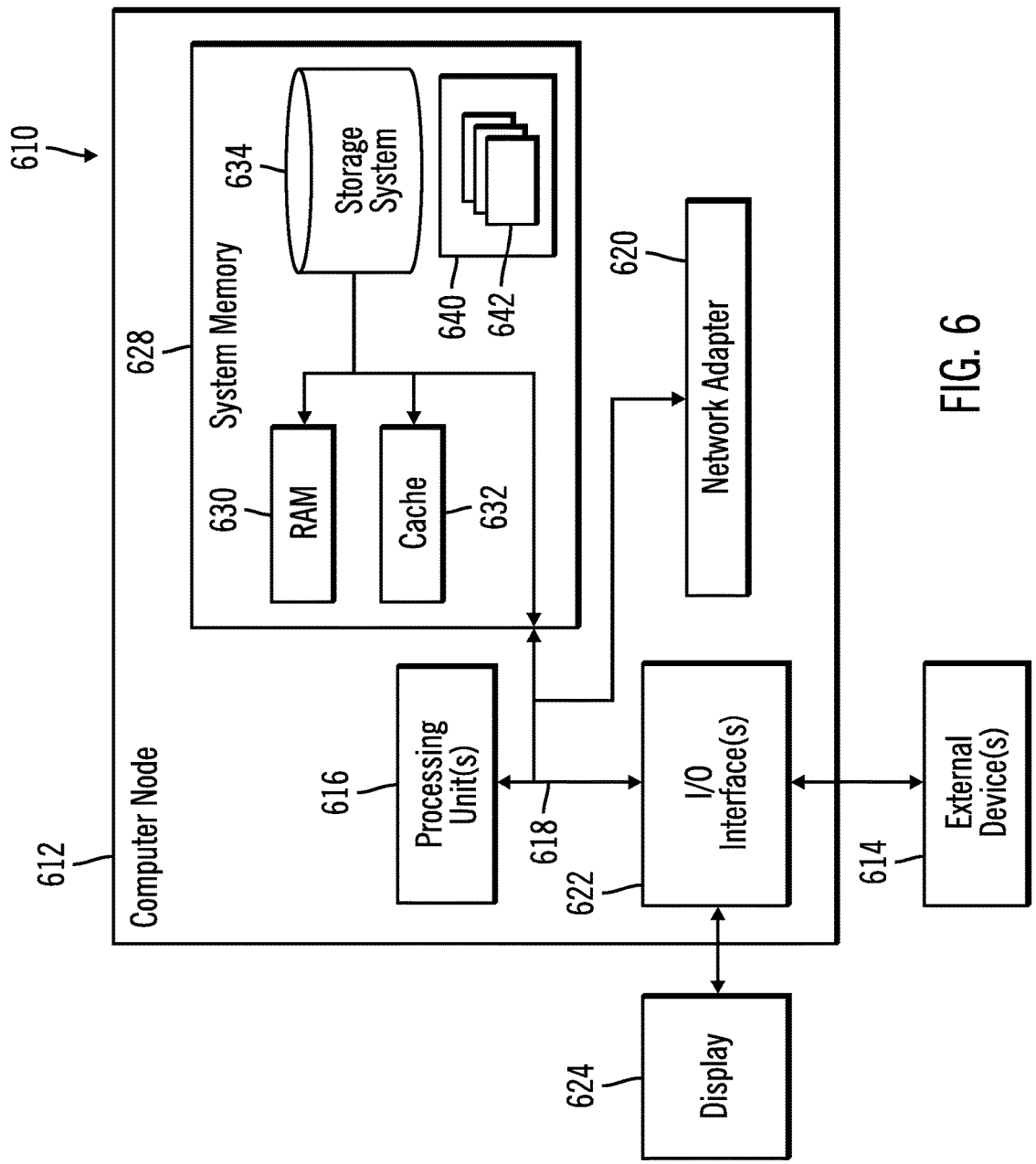
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 in cloud computing node 610 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
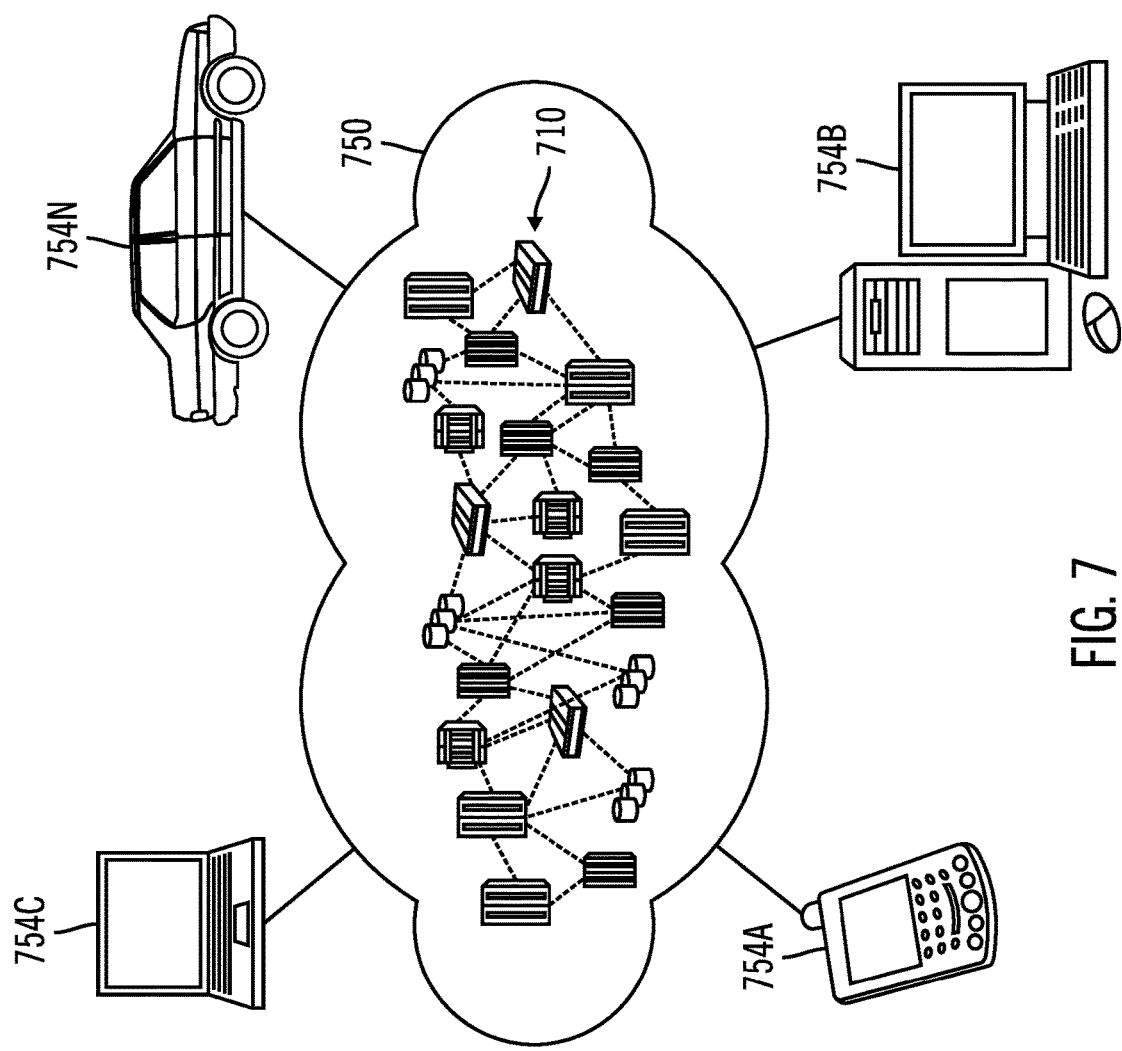
FIG. 7 illustrates a cloud computing environment in accordance with certain embodiments.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
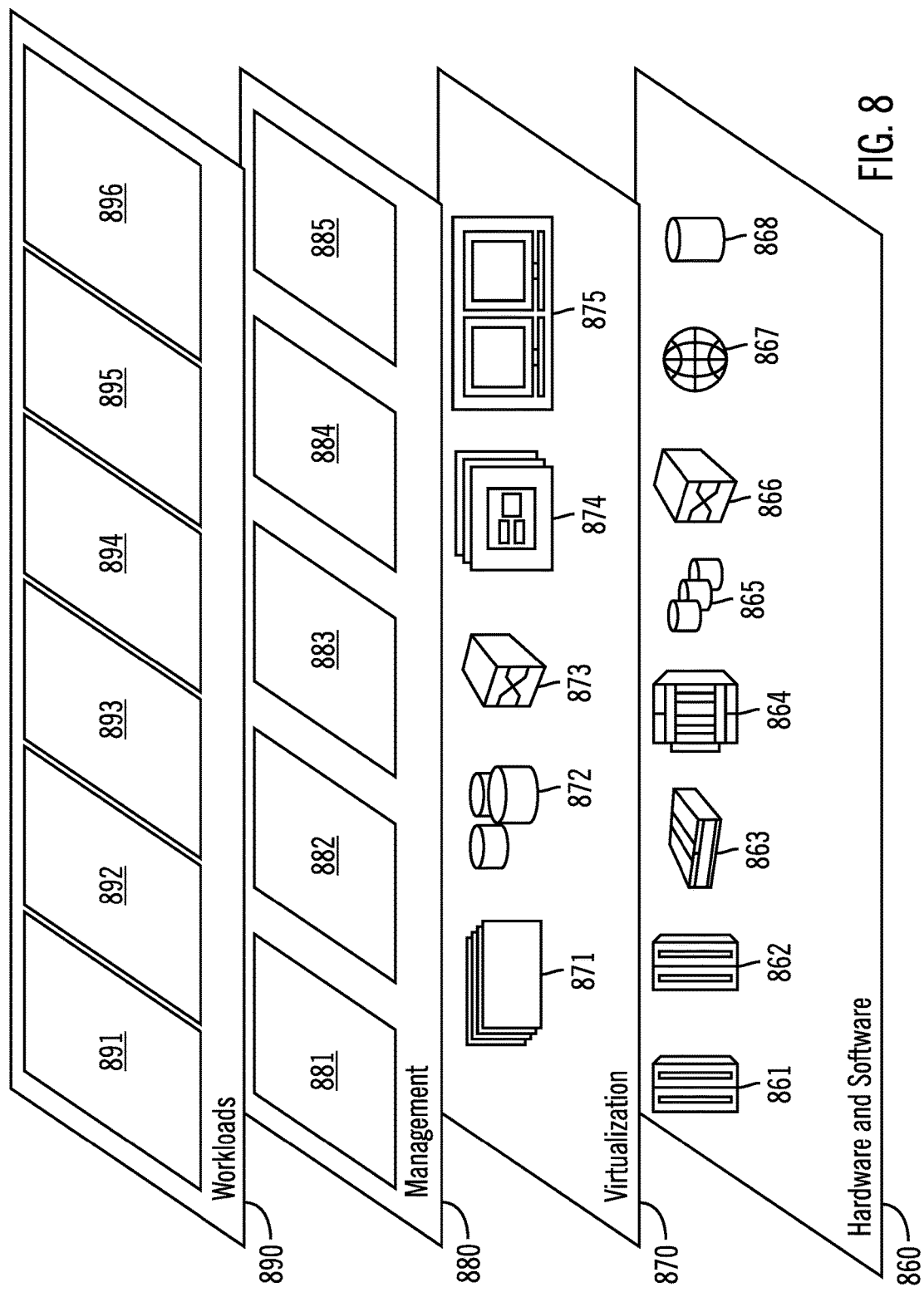
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and ranking (of speeches) based on speech pattern detection 896.

Thus, in certain embodiments, software or a program, implementing ranking (of speeches) based on speech pattern detection in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for processing a query, comprising operations for:
   in response to receiving the query, identifying, using a processor of a computer, search results comprising items from multiple items stored in a data store;
   building a confidence model that applies speech characteristics in a context of public speaking experience level of a speaker and expertise level of the speaker;
   ranking the items of the search results using the confidence model based on a confidence score associated with each of the items, wherein the confidence score is generated for each of the items by,
     detecting the speech characteristics of the item;
     determining a hesitation level of the item based on the speech characteristics, wherein the hesitation level is adjusted based on counts including a count of filler words and pauses of the item, a count of each change in pitch of a user associated with the item, and a count of bridge transitions of the item;

generating a confidence score based on the hesitation level; and storing an item identifier of the item, the hesitation level, the confidence score, and the counts in a database; and displaying, on a display screen of the computer, the ranked items of the search results with the confidence score associated with each of the items to respond to the query.

2. The computer-implemented method of claim 1, wherein each of the multiple items is one of an oral speech and a written text.

3. The computer-implemented method of claim 1, wherein detecting the speech characteristics further comprises operations for:

determining the count of filler words and pauses of the item, the count of each change in pitch of a user associated with the item, the count of bridge transitions of the item, and a count for each one of additional speech characteristics of the item.

4. The computer-implemented method of claim 3, wherein the additional speech characteristics of the item comprise articulation, pronunciation, speech disfluency, speech pitch, speech rate, and speech rhythm.

5. The computer-implemented method of claim 3, wherein determining the hesitation level further comprises operations for:

adjusting the hesitation level based on the count for each one of the additional speech characteristics of the item.

6. The computer-implemented method of claim 1, wherein determining the hesitation level further comprises operations for:

adjusting the hesitation level based on a public speaking experience level and an expertise of a user associated with the item.

7. The computer-implemented method of claim 1, wherein a Software as a Service (SaaS) is configured to perform the operations of the computer-implemented method.

8. A computer program product for processing a query, the computer program product comprising a computer readable storage medium having program code embodied therewith, the program code executable by at least one processor of a computer to perform operations for:

in response to receiving the query, identifying search results comprising items from multiple items stored in a data store;

building a confidence model that applies speech characteristics in a context of public speaking experience level of a speaker and expertise level of the speaker;

ranking the items of the search results using the confidence model based on a confidence score associated with each of the items, wherein the confidence score is generated for each of the items by, detecting the speech characteristics of the item;

determining a hesitation level of the item based on the speech characteristics, wherein the hesitation level is adjusted based on counts including a count of filler words and pauses of the item, a count of each change in pitch of a user associated with the item, and a count of bridge transitions of the item;

generating a confidence score based on the hesitation level; and storing an item identifier of the item, the hesitation level, the confidence score, and the counts in a database; and displaying, on a display screen of the computer, the ranked items of the search results with the confidence score associated with each of the items to respond to the query.

9. The computer program product of claim 8, wherein each of the multiple items is one of an oral speech and a written text.

10. The computer program product of claim 8, wherein, when detecting the speech characteristics, the program code is executable by the at least one processor to perform a further operation for:

determining the count of filler words and pauses of the item, the count of each change in pitch of a user associated with the item, the count of bridge transitions of the item, and a count for each one of additional speech characteristics of the item.

11. The computer program product of claim 10, wherein the additional speech characteristics of the item comprise articulation, pronunciation, speech disfluency, speech pitch, speech rate, and speech rhythm.

12. The computer program product of claim 10, wherein, when determining the hesitation level, the program code is executable by the at least one processor to perform a further operation for:

adjusting the hesitation level based on the count for each one of the additional speech characteristics of the item.

13. The computer program product of claim 8, wherein, when determining the hesitation level, the program code is executable by the at least one processor to perform a further operation for:

adjusting the hesitation level based on a public speaking experience level and an expertise of a user associated with the item.

14. The computer program product of claim 8, wherein a Software as a Service (SaaS) is configured to perform the operations of the computer program product.

15. A computer system for processing a query, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

in response to receiving the query, identifying search results comprising items from multiple items stored in a data store;

building a confidence model that applies speech characteristics in a context of public speaking experience level of a speaker and expertise level of the speaker;

ranking the items of the search results using the confidence model based on a confidence score associated with each of the items, wherein the confidence score is generated for each of the items by, detecting the speech characteristics of the item;

determining a hesitation level of the item based on the speech characteristics, wherein the hesitation level is adjusted based on counts including a count of filler words and pauses of the item, a count of each change in pitch of a user associated with the item, and a count of bridge transitions of the item;

generating a confidence score based on the hesitation level; and storing an item identifier of the item, the hesitation level, the confidence score, and the counts in a database; and displaying, on a display screen of the computer system, the ranked items of the search results with the confidence score associated with each of the items to respond to the query.

16. The computer system of claim 15, wherein each of the multiple items is one of an oral speech and a written text.

17. The computer system of claim 15, wherein the operations for detecting the speech characteristics further comprise:

determining the count of filler words and pauses of the item, the count of each change in pitch of a user associated with the item, the count of bridge transitions of the item, and a count for each one of additional speech characteristics of the item.

18. The computer system of claim 17, wherein the additional speech characteristics of the item comprise articulation, pronunciation, speech disfluency, speech pitch, speech rate, and speech rhythm.

19. The computer system of claim 17, wherein the operations for determining the hesitation level further comprise:

adjusting the hesitation level based on the count for each one of the additional speech characteristics of the item.

20. The computer system of claim 17, wherein a Software as a Service (SaaS) is configured to perform the operations of the computer system.

* * * * *